(12) United States Patent
Chakra et al.

(10) Patent No.: US 9,922,118 B2
(45) Date of Patent: *Mar. 20, 2018

(54) CREATING AN AUDIO FILE SAMPLE BASED UPON USER PREFERENCES

(71) Applicant: INTERNATIONAL BUSINESS MACHINES CORPORATION, Armonk, NY (US)

(72) Inventors: Al Chakra, Apex, NC (US); John A. Feller, Cary, NC (US); Trudy L. Hewitt, Cary, NC (US); Francesco C. Schembari, Durham, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/437,436

(22) Filed: Feb. 20, 2017

(65) Prior Publication Data

US 2017/0161379 A1 Jun. 8, 2017

Related U.S. Application Data

(63) Continuation of application No. 14/697,624, filed on Apr. 28, 2015, now Pat. No. 9,606,766.

(51) Int. Cl.
*G06F 17/00* (2006.01)
*G06F 17/30* (2006.01)
*G06F 3/16* (2006.01)

(52) U.S. Cl.
CPC ........ *G06F 17/30761* (2013.01); *G06F 3/165* (2013.01); *G06F 17/30778* (2013.01)

(58) Field of Classification Search
CPC .............. G06F 3/165; G06F 17/30743; G06F 17/30746; G06F 17/30758;
(Continued)

(56) References Cited

U.S. PATENT DOCUMENTS 6,225,546 B1 5/2001 Kraft et al.
6,633,845 B1 10/2003 Logan et al.
(Continued)

OTHER PUBLICATIONS

Lam Calvin K.M. et al. The Internet is Changing the Music Industry. Communications of the ACM, vol. 44, No. 8, pp. 62-68, Aug. 2001, ACM.

(Continued)

*Primary Examiner* — Andrew C Flanders
(74) *Attorney, Agent, or Firm* — The Steadman Law Firm PLLC

(57) ABSTRACT

An approach is described for creating an audio file sample based upon user preferences. An associated method may include detecting selection of an audio file by a user, wherein the selection of the audio file occurs via a communications network and indexing the audio file to create a plurality of indexed segments based upon audio analysis. The method further may include selecting at least one segment among the plurality of indexed segments based upon a profile of the user and incorporating the at least one selected segment into an audio sample having a designated length. Indexing the audio file to create a plurality of indexed segments based upon audio analysis may include, for each audio characteristic among a plurality of designated audio characteristics, creating from the audio file at least one indexed segment corresponding to the audio characteristic.

20 Claims, 6 Drawing Sheets

(58) Field of Classification Search
CPC ......... G06F 17/30761; G06F 17/30766; G06F 17/30029; G06F 17/30035; G06F 17/30749; G06F 17/30752
See application file for complete search history.

(56) References Cited

U.S. PATENT DOCUMENTS

| | | | |
|---|---|---|---|
| 7,003,515 B1 | 2/2006 | Glaser et al. | |
| 7,038,118 B1 | 5/2006 | Gimarc | |
| 7,319,185 B1 | 1/2008 | Wieder | |
| 7,826,911 B1 | 11/2010 | Bennett | |
| 8,005,768 B2 | 8/2011 | Yang et al. | |
| 8,666,749 B1 | 3/2014 | Subramanya et al. | |
| 8,688,253 B2 | 4/2014 | Master et al. | |
| 8,716,584 B1 | 5/2014 | Wieder | |
| 9,037,278 B2 | 5/2015 | Smith | |
| 9,606,766 B2 * | 3/2017 | Chakra | G06F 3/165 |
| 2001/0003813 A1 | 6/2001 | Sugano et al. | |
| 2002/0078029 A1 | 6/2002 | Pachet | |
| 2003/0045954 A1 | 3/2003 | Weare et al. | |
| 2004/0260682 A1 | 12/2004 | Herley et al. | |
| 2005/0004690 A1 | 1/2005 | Zhang et al. | |
| 2005/0038819 A1 | 2/2005 | Hicken et al. | |
| 2005/0091062 A1 | 4/2005 | Burges et al. | |
| 2006/0059504 A1 | 3/2006 | Gomez et al. | |
| 2006/0288845 A1 | 12/2006 | Gale | |
| 2008/0314232 A1 | 12/2008 | Hansson et al. | |
| 2009/0049979 A1 | 2/2009 | Naik et al. | |
| 2009/0272253 A1 | 11/2009 | Yamashita et al. | |
| 2011/0035035 A1 | 2/2011 | Khan et al. | |
| 2011/0041059 A1 | 2/2011 | Amarasingham et al. | |
| 2011/0202567 A1 | 8/2011 | Bach et al. | |
| 2012/0240045 A1 | 9/2012 | Bradley et al. | |
| 2013/0073362 A1 | 3/2013 | Panzironi et al. | |
| 2013/0145385 A1 | 6/2013 | Aghajanyan et al. | |
| 2013/0332471 A1 | 12/2013 | Hohl et al. | |
| 2014/0279817 A1 | 9/2014 | Whitman et al. | |
| 2015/0068389 A1 | 3/2015 | Sugano | |

OTHER PUBLICATIONS

Cole, Tom. You Ask, We Answer: Why Are Online Song Preview Samples So Short? The Record: Music News From NPR, Dec. 14, 2010, NPR. <http://www.npr.org/blogs/therecord/2010/12/14/132054317>.

List of IBM Patents or Patent Applications Treated as Related, Feb. 20, 2017.

* cited by examiner

CREATING AN AUDIO FILE SAMPLE BASED UPON USER PREFERENCES

BACKGROUND

The various embodiments described herein generally relate to audio file sampling. More specifically, the various embodiments describe techniques for creating a sample of an audio file based upon user preferences.

Various online applications host audio files to be streamed, purchased, or otherwise processed by users. Samples of such audio files often are made available for preview purposes. Conventional samples generally include a musical refrain from the audio files or an excerpt from the beginning of the audio files, without regard for individual user interests. The content and length of such samples may be determined primarily as a result of licensing or other financial considerations of the online applications or the music publishers. Furthermore, conventional samples may not provide a representative preview of the audio files, especially when the audio files include diverse aspects. Online applications generally present a single predetermined sample for a given audio file.

SUMMARY

The various embodiments of the invention provide techniques for creating a sample of an audio file based upon user preferences. An associated method may include detecting selection of an audio file by a user. The selection of the audio file by the user may occur via a communications network. The method further may include indexing the audio file to create a plurality of indexed segments based upon audio analysis. The method further may include selecting at least one segment among the plurality of indexed segments based upon a profile of the user and incorporating the at least one selected segment into an audio sample having a designated length. The designated length may be one of a fixed length of the audio file or a percentage of the audio file.

In an embodiment, the method step of selecting at least one segment among the plurality of indexed segments may include selecting multiple segments among the plurality of indexed segments. According to such embodiment, the multiple segments may be noncontiguous. Furthermore, according to such embodiment, the method step of incorporating the at least one selected segment into an audio sample may include adding respective transitional elements among the multiple segments.

In a further embodiment, the method step of indexing the audio file to create a plurality of indexed segments based upon audio analysis may include, for each audio characteristic among a plurality of designated audio characteristics, creating from the audio file at least one indexed segment corresponding to the audio characteristic. According to such embodiment, the designated audio characteristics may include at least one of repeated melody, repeated lyrics, lyrics reflective of audio file title, or song portion. According to such embodiment, the designated audio characteristics further may include at least one of artist identity, number of artists, instrument selection, or relative audio volume. Moreover, according to such embodiment, the profile of the user may include preferred audio characteristics among the plurality of designated audio characteristics. Additionally, the preferred audio characteristics may be at least partially determined based upon a current collection of audio files associated with the user. Furthermore, the profile of the user may include priority designations which prioritize the preferred audio characteristics based upon relative importance to the user.

In an embodiment, the method step of selecting at least one segment among the plurality of indexed segments based upon the profile of the user may include selecting a number of segments among the plurality of indexed segments based upon the priority designations. The number of segments selected based upon the priority designations may be determined by segment availability based upon the priority designations and a predefined threshold based upon the designated length. According to such embodiment, the method step of selecting at least one segment among the plurality of indexed segments further may include selecting a number of segments among the plurality of indexed segments based upon at least one default audio characteristic determined among the plurality of designated audio characteristics. The number of segments selected based upon the at least one default audio characteristic may be determined by segment availability based upon at least one default audio characteristic and the predefined threshold. Furthermore, the method step of selecting at least one segment among the plurality of indexed segments may include selecting a number of segments among the plurality of indexed segments at the beginning of the audio file. The number of segments selected at the beginning of the audio file may be determined by the predefined threshold.

In a further embodiment, the method step of selecting at least one segment among the plurality of indexed segments based upon the profile of the user may include, upon determining that at least one segment is available among the plurality of indexed segments based upon the priority designations, selecting a first segment among the plurality of indexed segments based upon the priority designations, and, upon determining that a predefined threshold based upon the designated length has not been met or exceeded, selecting a number of further segments among the plurality of indexed segments contiguous to the first segment based upon the predefined threshold. The method step of selecting at least one segment among the plurality of indexed segments further may include, upon determining that no segment is available among the plurality of indexed segments based upon the priority designations, and upon determining that at least one segment is available among the plurality of indexed segments based upon at least one default audio characteristic determined among the plurality of designated audio characteristics, selecting a first segment among the plurality of indexed segments based upon the at least one default audio characteristic, and, upon determining that the predefined threshold has not been met or exceeded, selecting a number of further segments among the plurality of indexed segments contiguous to the first segment based upon the predefined threshold. The method step of selecting at least one segment among the plurality of indexed segments further may include, upon determining that no segment is available among the plurality of indexed segments based upon the priority designations, and upon further determining that no segment is available among the plurality of indexed segments based upon the at least one default audio characteristic, selecting a first segment at the beginning of the audio file, and selecting a number of further segments among the plurality of indexed segments contiguous to the first segment based upon the predefined threshold.

An additional embodiment includes a computer program product including a computer readable storage medium having program instructions embodied therewith, wherein the program instructions may be executable by a computing device to cause the computing device to perform one or more steps of above recited method. A further embodiment includes a system having a processor and a memory storing an application program, which, when executed on the processor, performs one or more steps of the above recited method.

BRIEF DESCRIPTION OF THE DRAWINGS

So that the manner in which the above recited aspects are attained and can be understood in detail, a more particular description of embodiments, briefly summarized above, may be had by reference to the appended drawings.

Note, however, that the appended drawings illustrate only typical embodiments of this invention and are therefore not to be considered limiting of its scope, for the invention may admit to other equally effective embodiments.

DETAILED DESCRIPTION

Figure 1:
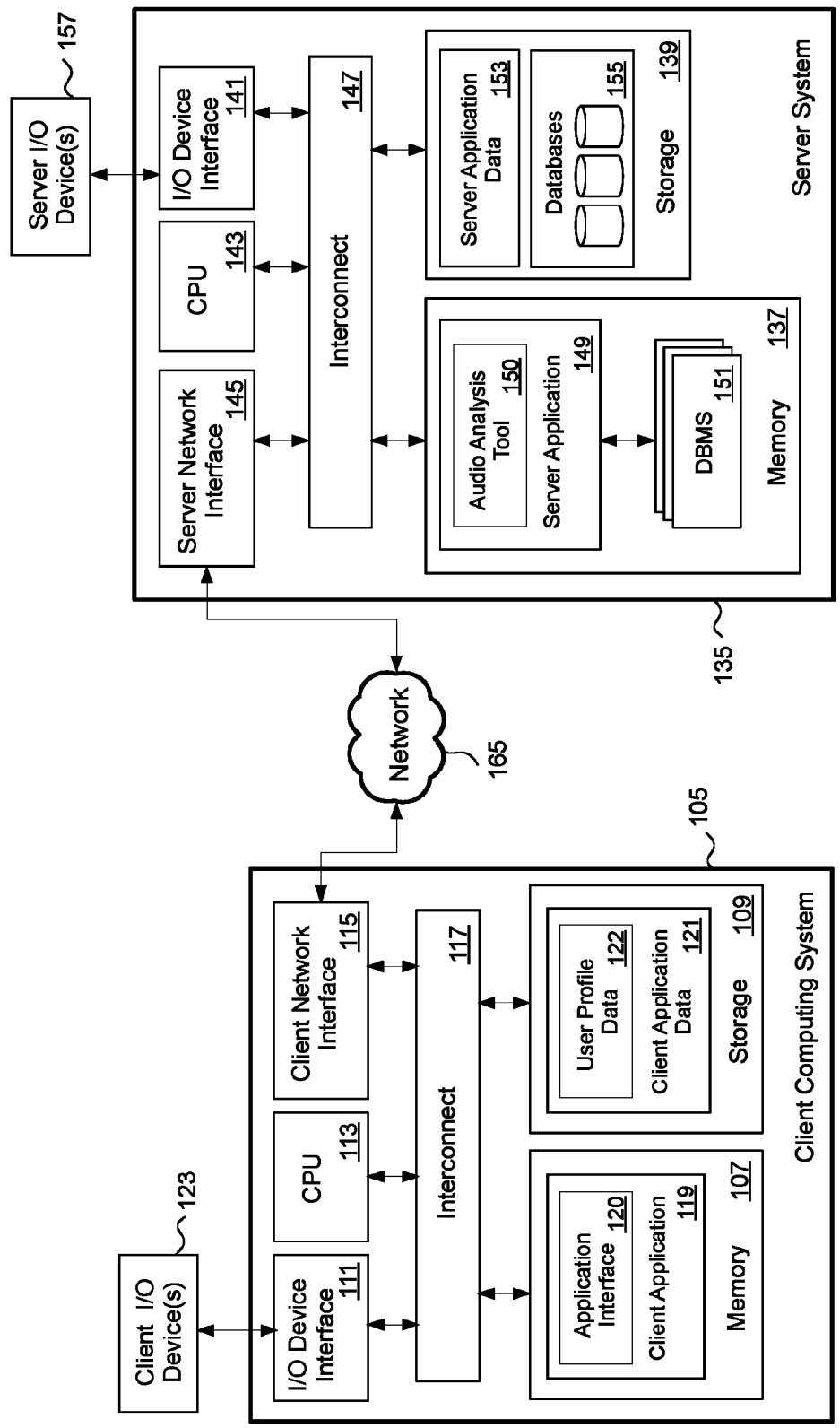
FIG. 1 illustrates a computing infrastructure, according to an embodiment.

The various embodiments described herein are directed to techniques for creating a sample of an audio file based upon user preferences. More specifically, the sample may be created based upon priority designations within a user profile. Such priority designations may reflect audio characteristics preferred by a user within audio files.

The various embodiments described herein may have advantages over conventional techniques of creating an audio file sample. Specifically, the various embodiments may provide the ability to create a customized sample of an audio file (e.g., a song). More specifically, the various embodiments may provide the ability to customize an audio sample by selecting one or more segments within a single audio file based upon user preferences determined via a profile or otherwise. Furthermore, the various embodiments may permit a user to indicate musical or other audio preferences based upon artist, instrument use, volume level, or other audio characteristics. Some of the various embodiments may not include all such advantages, and such advantages are not necessarily required of all embodiments.

In the following, reference is made to various embodiments of the invention. However, it should be understood that the invention is not limited to specific described embodiments. Instead, any combination of the following features and elements, whether related to different embodiments or not, is contemplated to implement and practice the invention. Furthermore, although embodiments may achieve advantages over other possible solutions and/or over the prior art, whether or not a particular advantage is achieved by a given embodiment is not limiting. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The various embodiments described herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in the cloud, without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of this disclosure, workloads of a client computing system or server system running an application according to the various embodiments described herein may be deployed to a computing cloud. Moreover, cloud-based database systems, virtual machines, and a variety of other server applications may be used to manage such workloads.

Further, particular embodiments describe techniques for creating an audio file sample based upon user preferences. However, it should be understood that the techniques described herein may be adapted to a variety of purposes in addition to those specifically described herein. Accordingly, references to specific embodiments are included to be illustrative and not limiting.

FIG. 1 illustrates a computing infrastructure 100 according to an embodiment. As shown, computing infrastructure 100 includes a client computing system 105 and a server system 135, each of which may be connected to a communications network 165.

Illustratively, client computing system 105 may include a memory 107, storage 109, input/output (I/O) device interface 111, a central processing unit (CPU) 113, and a client network interface 115, all of which may be interconnected via interconnect 117 (e.g., a bus). Although shown as a single computing system, client computing system 105 is included to be representative of a single client or multiple clients. In an embodiment, client computing system 105 may be a thin client. In a further embodiment, client computing system 105 may be a mobile device (e.g., a cellular telephone or a tablet device). Memory 107 may include a client application 119. Client application 119 may interface with server system 135 and other computing systems via application interface 120. Application interface 120 may be a browser or other online interface. Storage 109 may include client application data 121 associated with client application 119. Client application data 121 may include user profile data 122 indicating user preferences and/or interests. I/O device interface 111 may be communicatively coupled to one or more client I/O devices 123. CPU 113 is included to be representative of a single CPU, multiple CPUs, a single CPU having multiple processing cores, and the like. Client network interface 115 may receive data from and transmit data to server system 135 or another computing system via network 165.

Server system 135 may include a memory 137, storage 139, I/O device interface 141, a CPU 143, and a server network interface 145, all of which may be interconnected via interconnect 147 (e.g., a bus). Although shown as a single computing system, server system 135 is included to be representative of a single server system or multiple server systems. Memory 137 may include a server application 149. The server application 149 may be an online application for hosting and processing audio files and samples of such audio files. Furthermore, server application 149 may include audio analysis tool 150. Audio analysis tool 150 may index or facilitate indexing of an audio file to create a plurality of indexed segments and further may incorporate or facilitate incorporation of one or more of the plurality of indexed segments into a sample according to the various embodiments further described herein. As illustrated in FIG. 1, server application 149 interfaces with a database management system (DBMS) 151, which also is included in memory 137. DBMS 151 is included be representative of a single database system or multiple database systems. Storage 139 may include server application data 153 and databases 155. Server application 149 may generate and process server application data 153 based upon interaction with client computing system 105. Server application 149 may send database requests to DBMS 151, and server application 149 may process results returned by DBMS 151 to generate server application data 153. DBMS 151 may include a software application configured to manage databases 155. Databases 155 may include one or more relational databases. Additionally, databases 155 may include one or more ontology trees or other ontological structures. In the context of the various embodiments described herein, server application 149 may obtain audio files from databases 155 and may create and store samples of such audio files within server application data 153. While FIG. 1 illustrates three databases 155, computing infrastructure 100 may include any number of databases. According to an embodiment, DBMS 151 may send requests to remote databases (not shown) via network 165. Furthermore, server application 149 optionally may interface with at least one of a discussion forum, a social network, a product marketplace, or a weblog.

I/O device interface 141 may be communicatively coupled to one or more server I/O devices 157. CPU 143 is included to be representative of a single CPU, multiple CPUs, a single CPU having multiple processing cores, and the like. Server network interface 145 may receive data from and transmit data to client computing system 105 via network 165. Specifically, server application 149 may accept requests sent by client computing system 105 to server system 135 and may transmit data to client computing system 105 or other computing systems via server network interface 145.

Figure 2:
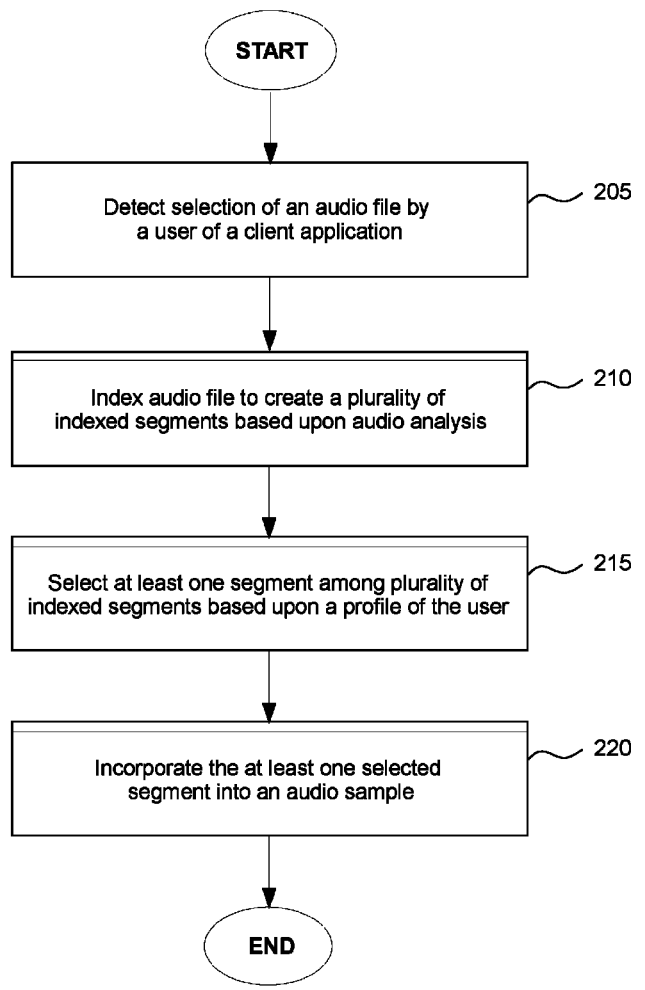
FIG. 2 illustrates a method of creating an audio file sample, according to an embodiment.

FIG. 2 illustrates a method 200 of creating a sample of an audio file, according to an embodiment. According to the method 200, an audio analysis tool associated with an online application (e.g., audio analysis tool 150 of server application 149) may create such audio file sample by indexing and processing the audio file according to user preferences.

The method 200 may begin at step 205, where the audio analysis tool may detect selection of an audio file by a user of a client application (e.g., client application 119). Selection of the audio file by the user may occur via a communications network (e.g., network 165). At step 210, the audio analysis tool may index the audio file to create a plurality of indexed segments based upon audio analysis. An embodiment pertaining to indexing the audio file according to step 210 is described further herein in a method 300. At step 215, the audio analysis tool may select at least one segment among the plurality of indexed segments created at step 210 based upon a profile of the user. Embodiments pertaining to selecting at least one segment among the plurality of indexed segments according to step 215 are described further herein in respective methods 400 and 500. In an embodiment, selecting at least one segment among the plurality of indexed segments at step 215 may include selecting multiple segments among the plurality of indexed segments. According to such embodiment, the multiple segments may be noncontiguous segments of the audio file. The online application may provide the user an option to designate whether segments selected should be contiguous. According to the method 400, the audio analysis tool may select segments that are either contiguous or noncontiguous. According to the method 500, the audio analysis tool may select segments that are contiguous.

At step 220, the audio analysis tool may incorporate the at least one selected segment into an audio sample for the user. The audio sample may have a designated length. In an embodiment, the designated length may be a fixed value. In another embodiment, the designated length may be a certain percentage of the audio file. According to an embodiment, the designated length may be determined via a developer or an administrator of the audio analysis tool. According to an alternative embodiment, the designated length may be designated via a sample length configuration setting. According to such alternative embodiment, the sample length configuration setting may be made available to the user via the online application. Furthermore, in an embodiment the audio analysis tool may make the audio sample available to the user via the online application, in which case the user may use the client application to access the audio sample via the communications network. Additionally or alternatively, the audio analysis tool may transmit the audio sample directly to the client application (e.g., for user storage or processing). An embodiment pertaining to incorporating the at least one selected segment into an audio sample according to step 220 is described further herein in a method 600.

Figure 3:
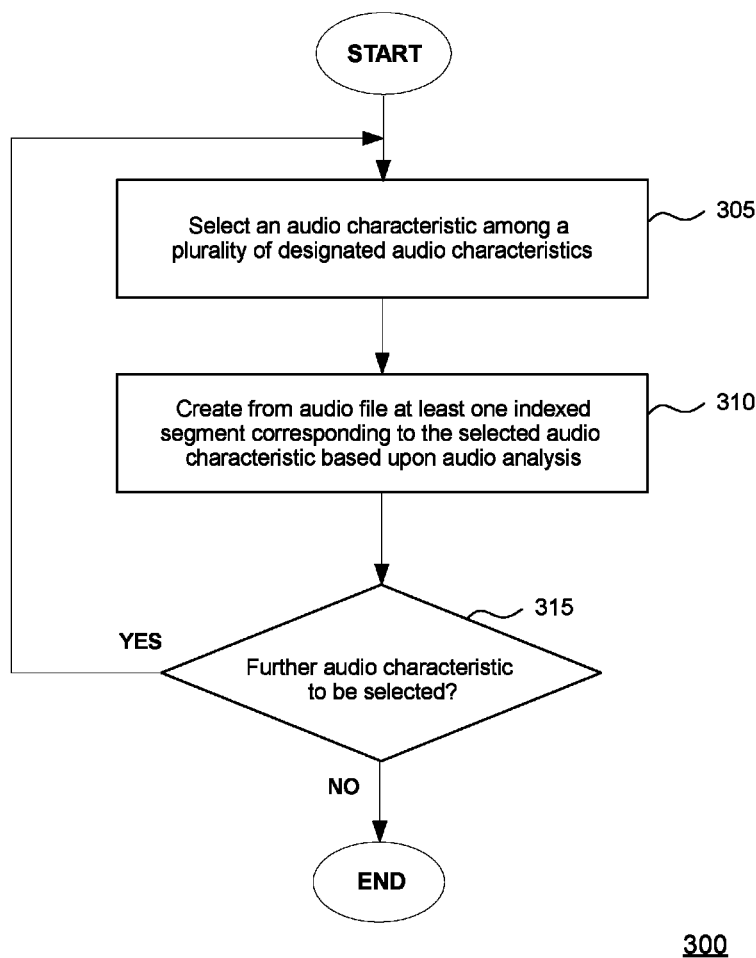
FIG. 3 illustrates a method of indexing an audio file to create a plurality of indexed segments, according to an embodiment.

FIG. 3 illustrates method 300 of indexing the audio file to create a plurality of indexed segments based upon audio analysis. The method 300 provides an example embodiment with respect to step 210 of the method 200. The method 300 may begin at step 305, where the audio analysis tool may select an audio characteristic among a plurality of designated audio characteristics. In an embodiment, the plurality of designated audio characteristics may be determined via a developer or an administrator of the audio analysis tool. In an embodiment, the plurality of designated audio characteristics may pertain to structural aspects of the audio file, including at least one of repeated melody, repeated lyrics, lyrics reflective of the title of the audio file, or song portion. Additionally or alternatively, the plurality of designated audio characteristics may pertain to content within the audio file, including at least one of artist identity, number of artists, instrument selection, or relative audio volume.

At step 310, the audio analysis tool may create from the audio file at least one indexed segment corresponding to the selected audio characteristic based upon audio analysis. Specifically, the audio analysis tool may scan the audio file for the selected audio characteristic and may create a respective indexed segment for each identified portion of the audio file that includes or otherwise pertains to the selected audio characteristic. For example, upon selection of an audio characteristic pertaining to repeated lyrics, the audio analysis tool may create indexed segments based upon the presence of repeated lyrics within respective portions of the audio file. Therefore, according to such example, the audio analysis tool may create indexed segments including the refrain or other repeated portions of the audio file. According to another example, upon selection of an audio characteristic pertaining to use of a saxophone, the audio analysis tool may create one or more indexed segments based upon the presence of characteristic saxophone sounds within one or more respective portions of the audio file.

At step 315, the audio analysis tool may determine whether there is a further audio characteristic to be selected among the designated audio characteristics. Upon determining that there is no further audio characteristic to be selected, the method 300 may end. Upon determining that there is a further audio characteristic to be selected, the method 300 may return to step 305.

Figure 4:
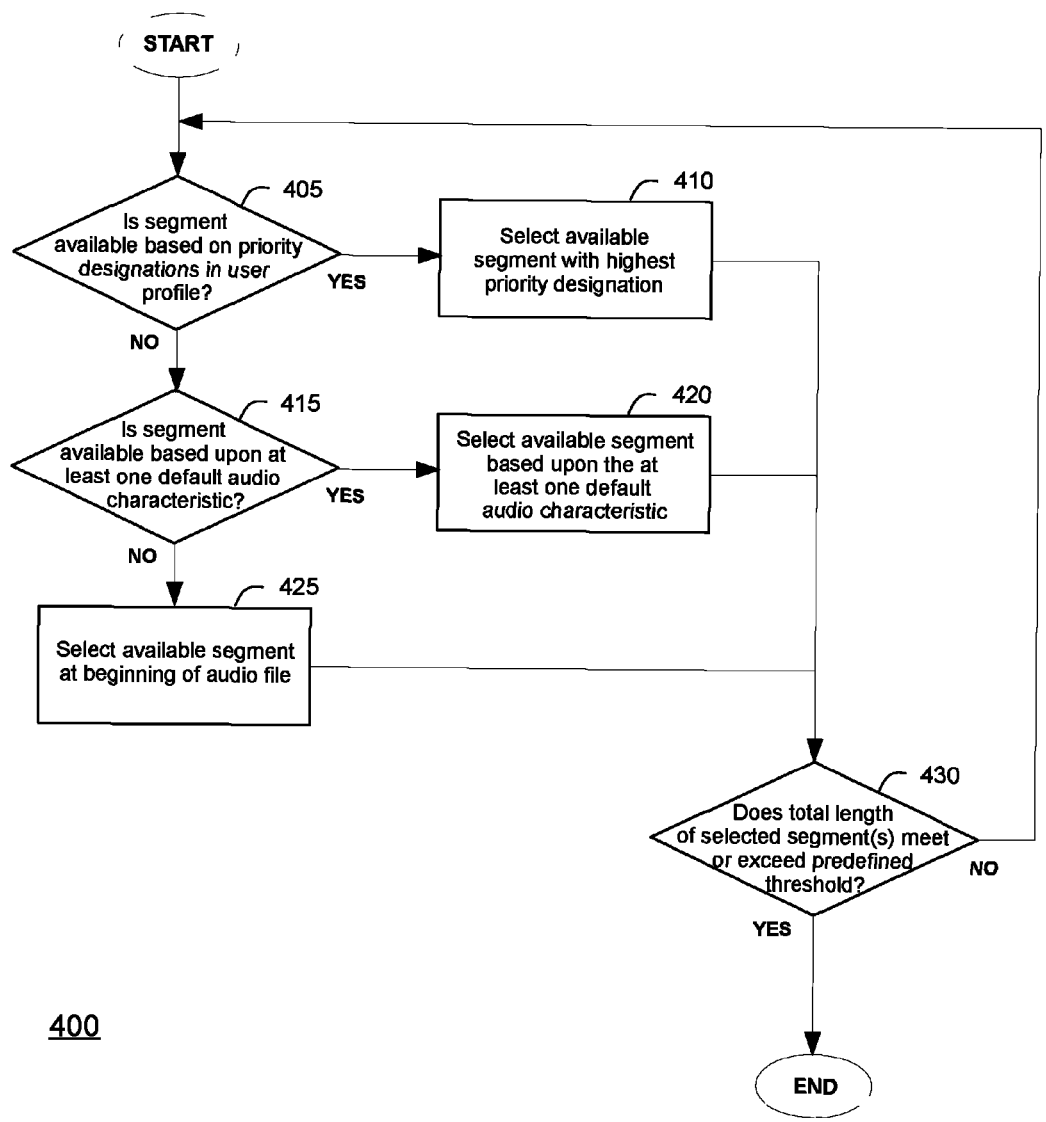
FIG. 4 illustrates a method of selecting at least one segment among a plurality of indexed segments based upon a user profile, according to an embodiment.
Figure 5:
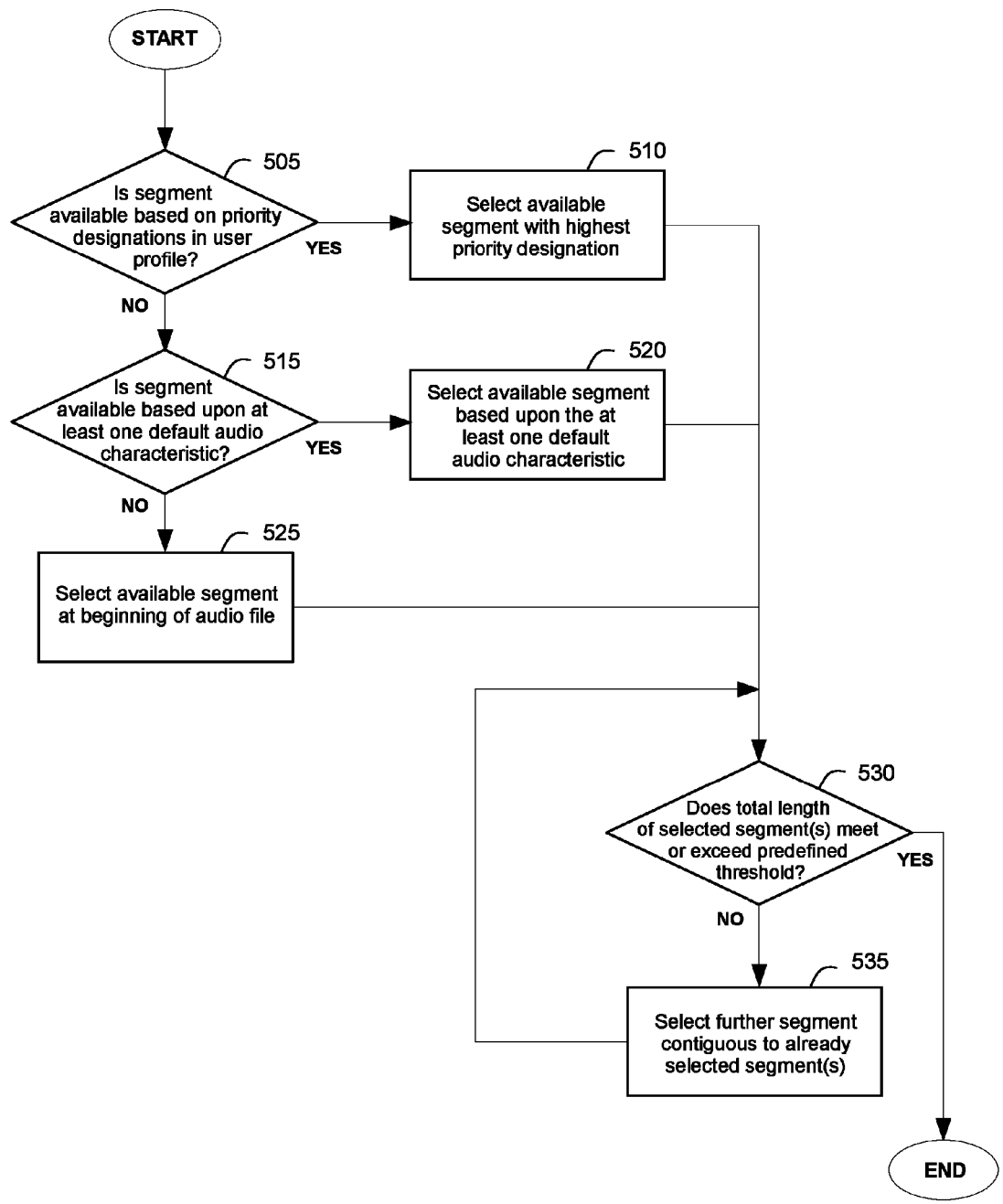
FIG. 5 illustrates a method of selecting at least one segment among a plurality of indexed segments based upon a user profile, according to a further embodiment.

FIGS. 4 and 5 illustrate respective methods 400 and 500 of selecting at least one segment among the plurality of indexed segments of the audio file based upon the profile of the user. The methods 400 and 500 provide respective example embodiments with respect to step 215 of the method 200. In the context of the methods 400 and 500, the profile of the user may include preferred audio characteristics among the plurality of designated audio characteristics previously discussed with respect to the method 300. According to an embodiment, the user may select the preferred audio characteristics via a preferred audio characteristic configuration setting provided by the online application. According to a further embodiment, the preferred audio characteristics may be determined, at least in part, based upon a current collection of audio files associated with the user. Such current collection of audio files may be based upon files the user previously sampled, purchased, streamed, or otherwise processed. For example, if the current collection of audio files associated with the user includes music from Artist A, then the profile of the user may indicate the music of Artist A as a preferred audio characteristic. Additionally or alternatively, the preferred audio characteristics may be determined, at least in part, based upon one or more other attributes associated with the profile of the user.

Moreover, according to an embodiment, the profile of the user may include priority designations which prioritize the preferred audio characteristics based upon relative importance to the user. The priority designations may determine the segment or segments among the plurality of indexed segments to be selected based upon the profile of the user. According to the above example, the profile of the user may include a relatively high priority designation for the music of Artist A such that audio file segments associated with the music of Artist A may be selected relatively early from the audio file according to the method 400 or according to the method 500. Additionally, assuming that the audio file includes a duet with Artist A and Artist B, a relatively high priority designation for the music of Artist A and a relatively low priority designation for Artist B may result in segments of the audio file including only Artist A being selected over segments including only Artist B and/or segments including both Artist A and Artist B. Priority designations associated with the profile of the user are described further herein with respect to the methods 400 and 500.

Furthermore, according to the methods 400 and 500, one or more indexed segments may be selected up to a predefined threshold. The predefined threshold may be based upon the designated length of the audio sample. According to an embodiment, the predefined threshold may be determined via a developer or an administrator of the audio analysis tool. According to an alternative embodiment, the predefined threshold may be designated via a threshold configuration setting. According to such alternative embodiment, the threshold configuration setting may be made available to the user via the online application.

According to the method 400, the one or more segments selected may be contiguous or noncontiguous. As illustrated in FIG. 4, the method 400 may begin at step 405, where the audio analysis tool may determine whether a segment among the plurality of indexed segments is available based upon priority designations in the profile of the user. Upon determining that a segment is available based upon the priority designations, at step 410 the audio analysis tool may select among the plurality of indexed segments an available segment having the highest priority designation. Subsequently, the method 400 may proceed to step 430, which is described further herein. As an example, if the profile of the user includes priority designations indicating a top preference for saxophone music followed by a preference for trumpet music, then according to steps 405 and 410 the audio analysis tool may select a segment including saxophone music, assuming that such a segment is available. If a segment including saxophone music is not available, then the audio analysis tool may select a segment including trumpet music, assuming that such a segment is available. If a segment including trumpet music is not available, then according to steps 405 and 410 the audio analysis tool may continue seeking an available segment having the highest priority designation until such segment is found.

Upon determining that a segment is not available among the plurality of indexed segments based upon the priority designations (e.g., there are no priority designations available, or all segments based upon the priority designations were selected in previous iterations), the method 400 may proceed to step 415, where the audio analysis tool may determine whether a segment among the plurality of indexed segments is available based upon at least one default audio characteristic determined among the plurality of designated audio characteristics. Hence, the at least one default audio characteristic may be used to select a segment among the plurality of indexed segments in the event that there are not enough segments available based upon priority designations in the profile of the user.

According to an embodiment, the at least one default audio characteristic may be determined via a developer or an administrator of the audio analysis tool. In such embodiment, in the event that more than one default audio characteristic is determined, the default audio characteristics may be ordered by the developer or the administrator. According to an alternative embodiment, the at least one default audio characteristic may be designated via a default audio configuration setting. In such alternative embodiment, the default audio configuration setting may be made available to the user via the online application. Furthermore, in such alternative embodiment, in the event that more than one default audio characteristic is determined, the default audio characteristics may be ordered via the default audio configuration setting. According to such alternative embodiment, the user may choose one or more audio characteristics for sampling purposes even if the user does not have an established profile with priority designations.

Upon determining that a segment is available based upon the at least one default audio characteristic, at step 420 the audio analysis tool may select among the plurality of indexed segments an available segment based upon the at least one default audio characteristic, and the method 400 may proceed to step 430. In the event that more than one default audio characteristic is designated, the audio analysis tool may select an available segment based upon the default audio characteristic ordered highest. For example, assuming that the at least one default characteristic includes musical refrain ordered highest and lyrics reflective of the audio file title ordered second highest, then at step 420 the audio analysis tool may select a musical refrain segment if available. If a musical refrain segment is not available, then at step 420 the audio analysis tool may select a segment including lyrics reflective of the audio file title if available. If a segment including lyrics reflective of the audio file title is not available, then according to steps 415 and 420 the audio analysis tool may continue seeking an available segment based upon the at least one default audio characteristic until such segment is found.

Upon determining that a segment is not available among the plurality of indexed segments based upon the at least one default audio characteristic (e.g., there is no default audio characteristic available, or all segments based upon at least one default audio characteristic were selected in previous iterations), at step 425 the audio analysis tool may select an available segment among the plurality of indexed segments at the beginning of the audio file, and the method 400 may proceed to step 430.

At step 430, the audio analysis tool may determine whether the total length of the segment or segments selected thus far via the method 400 meets or exceeds the predefined threshold. Upon determining that the total length of the segment or segments selected does not meet the predefined threshold, the method may return to step 405. Upon determining that the total length of the segments or segments selected meets or exceeds the predefined threshold, the method 400 may end.

According to the method 500, the one or more segments selected are contiguous. As illustrated in FIG. 5, the method 500 may begin at step 505, where the audio analysis tool may determine whether a segment among the plurality of indexed segments is available based upon priority designations in the profile of the user. Upon determining that a segment is available based upon the priority designations, at step 510 the audio analysis tool may select among the plurality of indexed segments an available segment having the highest priority designation as a first segment. Subsequently, the method 500 may proceed to step 530, which is described further herein.

Upon determining that a segment is not available among the plurality of indexed segments based upon the priority designations (e.g., there are no priority designations available), the method 500 may proceed to step 515, where the audio analysis tool may determine whether a segment among the plurality of indexed segments is available based upon at least one default audio characteristic determined among the plurality of designated audio characteristics. Upon determining that a segment is available based upon the at least one default audio characteristic, at step 520 the audio analysis tool may select among the plurality of indexed segments an available segment based upon the at least one default audio characteristic as the first segment. Subsequently, the method 500 may proceed to step 530.

Upon determining that a segment is not available among the plurality of indexed segments based upon the at least one default audio characteristic (e.g., there is no default audio characteristic available), at step 525 the audio analysis tool may select an available segment among the plurality of indexed segments at the beginning of the audio sample as the first segment, and the method 500 may proceed to step 530.

At step 530, the audio analysis tool may determine whether the length of the selected segment or segments selected thus far via the method 500 meets or exceeds the predefined threshold. Upon determining that the total length of the segment or segments selected does not meet the predefined threshold, then at step 535 the audio analysis tool may select a further segment contiguous to the already selected segment or segments, and the method 500 may return to step 530. Upon determining that the total length of the segments or segments selected meets or exceeds the predefined threshold, the method 500 may end.

According to an embodiment, in the event that the profile of the user is not well established (e.g., the user has only visited the online application once and/or has not sampled, purchased, or streamed music via the online application), the online application may use a general profile in lieu of the user profile for purposes of selecting at least one segment among the plurality of indexed segments in the context of the methods 400 and 500. Such general profile may include preferred characteristics and priority designations determined based upon other users of the online applications. Specifically, such general profile may be determined based upon all users of the online application, or alternatively such general profile may be determined based upon a subset of users of the online application (e.g., a subset of users within the same age range or within the same locale as the user).

Figure 6:
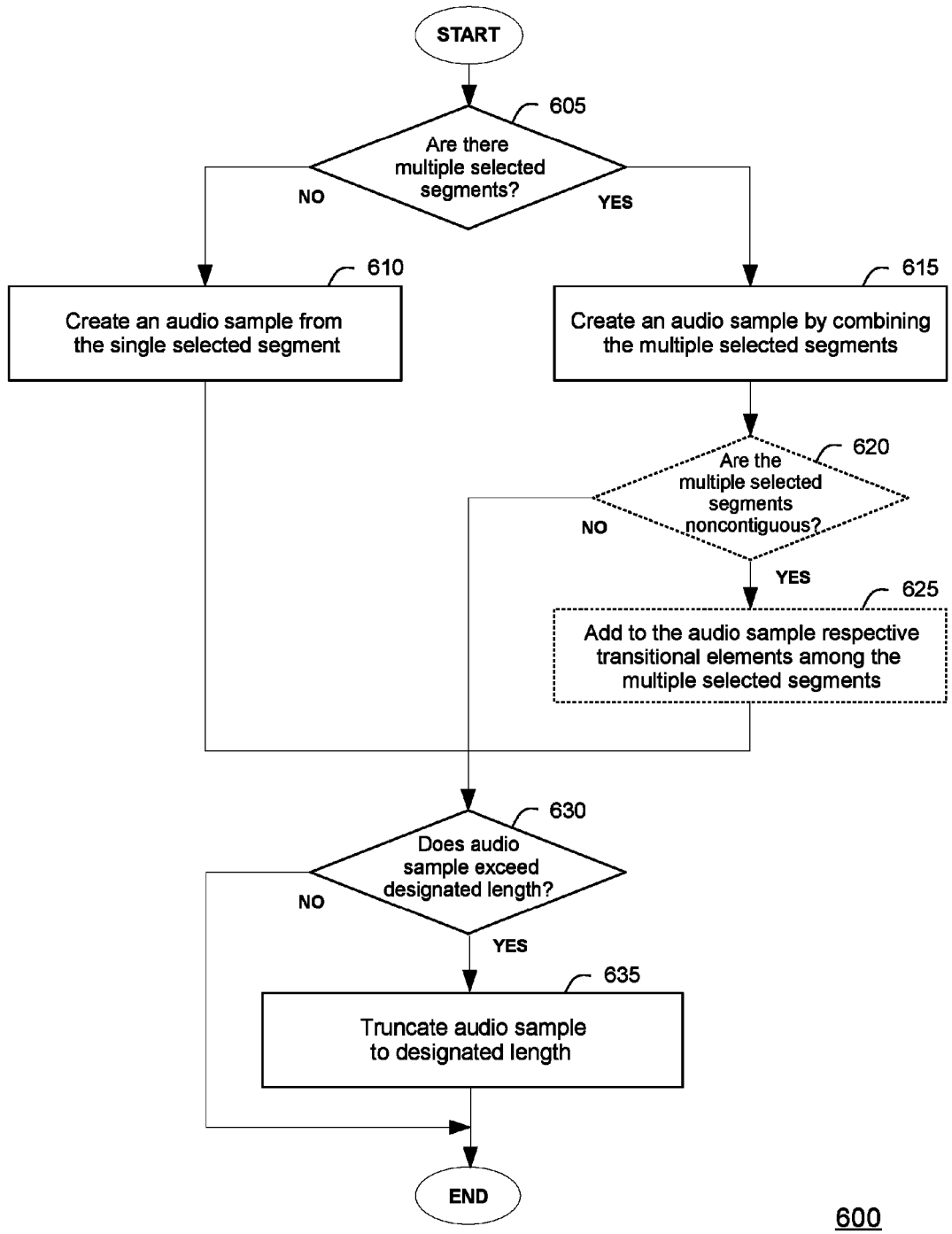
FIG. 6 illustrates a method of incorporating at least one segment selected among a plurality of indexed segments into an audio sample, according to an embodiment.

FIG. 6 illustrates method 600 of incorporating into an audio sample the at least one segment selected among the plurality of indexed segments of the audio file. The method 600 provides an example embodiment with respect to step 220 of the method 200. The method 600 may begin at step 605, where the audio analysis tool may determine whether there are multiple segments among the at least one segment selected according to step 215 of the method 200. Upon determining that there are not multiple segments selected, i.e., that only a single segment is selected, at step 610 the audio analysis tool may create an audio sample from the single selected segment, and the method 600 may proceed to step 630.

Upon determining that there are multiple selected segments, at step 615 the audio analysis tool may create an audio sample by combining the multiple selected segments. Optionally, at step 620, the audio analysis tool may determine whether the multiple selected segments are noncontiguous. Upon determining that the multiple selected segments are not noncontiguous (i.e., that they are contiguous), the method may proceed to step 630, which is further described herein. Upon determining that the multiple selected segments are noncontiguous, at step 625 the audio analysis tool may add to the audio sample respective transitional elements among the multiple selected segments. Such transitional elements may include fading effects between adjacent segments among the multiple segments (e.g., a fade-out effect followed by a fade-in effect) or brief intervals of silence between adjacent segments among the multiple segments.

At step 630, the audio analysis tool may determine whether the audio sample exceeds the designated length. Upon determining that the audio sample does not exceed the designated length, the method 600 may end. Upon determining that the audio sample exceeds the designated length, at step 635 the audio analysis tool may truncate the audio sample to the designated length, and the method 600 may end.

According to the various embodiments described herein, an audio sample may be created from an audio file based upon a user profile. As a result, an audio sample is not limited to a predefined portion of an audio file but rather may be customized according to user preferences.

While the foregoing description is directed to various embodiments, such description is not intended to limit the scope of the invention. All kinds of modifications made to the described embodiments and equivalent arrangements should fall within the protected scope of the invention. Hence, the scope of the invention should be explained most widely according to the claims that follow in connection with the detailed description, and should cover all the possibly equivalent variations and equivalent arrangements. Accordingly, further embodiments may be devised without departing from the basic scope of the invention.

What is claimed is:

1. A method comprising:
    detecting selection of an audio file by a user, wherein the selection of the audio file occurs via a communications network;
    indexing the audio file to create a plurality of indexed segments based upon audio analysis, wherein indexing the audio file comprises, for each audio characteristic among a plurality of designated audio characteristics, creating from the audio file at least one indexed segment corresponding to the audio characteristic;
    selecting at least one segment among the plurality of indexed segments based upon a profile of the user, wherein the profile of the user includes preferred audio characteristics among the plurality of designated audio characteristics and priority designations which prioritize the preferred audio characteristics based upon relative importance to the user, and wherein the selecting comprises:
        selecting a number of segments among the plurality of indexed segments based upon the priority designations, wherein the number of segments selected based upon the priority designations is determined by segment availability based upon the priority designations and a predefined threshold based upon the designated length; and
        selecting a number of segments among the plurality of indexed segments based upon at least one default audio characteristic determined among the plurality of designated audio characteristics, wherein the number of segments selected based upon the at least one default audio characteristic is determined by segment availability based upon at least one default audio characteristic and the predefined threshold; and
    incorporating the at least one selected segment into an audio sample having a designated length.

2. The method of claim 1, wherein the designated length is one of a fixed length of the audio file or a percentage of the audio file.

3. The method of claim 1, wherein selecting at least one segment among the plurality of indexed segments comprises selecting multiple segments, wherein the multiple segments are noncontiguous, and wherein incorporating the at least one selected segment into an audio sample comprises adding respective transitional elements among the multiple segments.

4. The method of claim 1, wherein the designated audio characteristics comprise at least one of (i) repeated melody, (ii) repeated lyrics, (iii) lyrics reflective of audio file title, or (iv) song portion.

5. The method of claim 1, wherein the designated audio characteristics comprise at least one of (i) artist identity, (ii) number of artists, (iii) instrument selection, or (iv) relative audio volume.

6. The method of claim 1, wherein the preferred audio characteristics are at least partially determined based upon a current collection of audio files associated with the user.

7. The method of claim 1, wherein selecting at least one segment among the plurality of indexed segments based upon the profile of the user further comprises:
    selecting a number of segments among the plurality of indexed segments at the beginning of the audio file, wherein the number of segments selected at the beginning of the audio file is determined by the predefined threshold.

8. The method of claim 1, wherein selecting at least one segment among the plurality of indexed segments based upon the profile of the user further comprises:
    upon determining that at least one segment is available among the plurality of indexed segments based upon the priority designations:
        selecting a first segment among the plurality of indexed segments based upon the priority designations; and
        upon determining that a predefined threshold based upon the designated length has not been met or exceeded, selecting a number of further segments among the plurality of indexed segments contiguous to the first segment, wherein the number of further segments selected is determined by the predefined threshold.

9. The method of claim 8, wherein selecting at least one segment among the plurality of indexed segments based upon the profile of the user further comprises:
    upon determining that no segment is available among the plurality of indexed segments based upon the priority designations, and upon determining that at least one segment is available among the plurality of indexed segments based upon at least one default audio characteristic determined among the plurality of designated audio characteristics:
        selecting a first segment among the plurality of indexed segments based upon the at least one default audio characteristic; and
        upon determining that the predefined threshold has not been met or exceeded, selecting a number of further segments among the plurality of indexed segments contiguous to the first segment, wherein the number of further segments selected is determined by the predefined threshold.

10. A computer program product comprising a computer readable storage medium having program instructions embodied therewith, wherein the computer readable storage medium is not a transitory signal per se, and wherein the program instructions are executable by a computing device to cause the computing device to:
    detect selection of an audio file by a user;
    index the audio file to create a plurality of indexed segments based upon audio analysis, wherein indexing the audio file comprises, for each audio characteristic among a plurality of designated audio characteristics, creating from the audio file at least one indexed segment corresponding to the audio characteristic;
    select at least one segment among the plurality of indexed segments based upon a profile of the user, wherein the profile of the user includes preferred audio characteristics among the plurality of designated audio characteristics and priority designations which prioritize the preferred audio characteristics based upon relative importance to the user, and wherein the selecting comprises:
  selecting a number of segments among the plurality of indexed segments based upon the priority designations, wherein the number of segments selected based upon the priority designations is determined by segment availability based upon the priority designations and a predefined threshold based upon the designated length; and
  selecting a number of segments among the plurality of indexed segments based upon at least one default audio characteristic determined among the plurality of designated audio characteristics, wherein the number of segments selected based upon the at least one default audio characteristic is determined by segment availability based upon at least one default audio characteristic and the predefined threshold; and
incorporate the at least one selected segment into an audio sample having a designated length.

11. The computer program product of claim 10, wherein the designated length is one of a fixed length of the audio file or a percentage of the audio file.

12. The computer program product of claim 10, wherein selecting at least one segment among the plurality of indexed segments comprises selecting multiple segments, wherein the multiple segments are noncontiguous, and wherein incorporating the at least one selected segment into an audio sample comprises adding respective transitional elements among the multiple segments.

13. The computer program product of claim 10, wherein the preferred audio characteristics are at least partially determined based upon a current collection of audio files associated with the user.

14. The computer program product of claim 10, wherein selecting at least one segment among the plurality of indexed segments based upon the profile of the user further comprises:
  selecting a number of segments among the plurality of indexed segments at the beginning of the audio file, wherein the number of segments selected at the beginning of the audio file is determined by the predefined threshold.

15. The computer program product of claim 10, wherein selecting at least one segment among the plurality of indexed segments based upon the profile of the user further comprises:
  upon determining that at least one segment is available among the plurality of indexed segments based upon the priority designations:
    selecting a first segment among the plurality of indexed segments based upon the priority designations; and
  upon determining that a predefined threshold based upon the designated length has not been met or exceeded, selecting a number of further segments among the plurality of indexed segments contiguous to the first segment, wherein the number of further segments selected is determined by the predefined threshold.

16. A system comprising:
a processor; and
a memory storing an application program, which, when executed on the processor, performs an operation comprising:
  detecting selection of an audio file by a user;
  indexing the audio file to create a plurality of indexed segments based upon audio analysis, wherein indexing the audio file comprises, for each audio characteristic among a plurality of designated audio characteristics, creating from the audio file at least one indexed segment corresponding to the audio characteristic;
  selecting at least one segment among the plurality of indexed segments based upon a profile of the user, wherein the profile of the user includes preferred audio characteristics among the plurality of designated audio characteristics and priority designations which prioritize the preferred audio characteristics based upon relative importance to the user, and wherein the selecting comprises:
    selecting a number of segments among the plurality of indexed segments based upon the priority designations, wherein the number of segments selected based upon the priority designations is determined by segment availability based upon the priority designations and a predefined threshold based upon the designated length; and
    selecting a number of segments among the plurality of indexed segments based upon at least one default audio characteristic determined among the plurality of designated audio characteristics, wherein the number of segments selected based upon the at least one default audio characteristic is determined by segment availability based upon at least one default audio characteristic and the predefined threshold; and
  incorporating the at least one selected segment into an audio sample having a designated length.

17. The system of claim 16, wherein the designated length is one of a fixed length of the audio file or a percentage of the audio file.

18. The system of claim 16, wherein selecting at least one segment among the plurality of indexed segments comprises selecting multiple segments, wherein the multiple segments are noncontiguous, and wherein incorporating the at least one selected segment into an audio sample comprises adding respective transitional elements among the multiple segments.

19. The system of claim 16, wherein the preferred audio characteristics are at least partially determined based upon a current collection of audio files associated with the user.

20. The system of claim 16, wherein selecting at least one segment among the plurality of indexed segments based upon the profile of the user further comprises:
  selecting a number of segments among the plurality of indexed segments at the beginning of the audio file, wherein the number of segments selected at the beginning of the audio file is determined by the predefined threshold.

* * * * *

UNITED STATES PATENT AND TRADEMARK OFFICE
CERTIFICATE OF CORRECTION

PATENT NO. : 9,922,118 B2
APPLICATION NO. : 15/437436
DATED : March 20, 2018
INVENTOR(S) : Al Chakra et al.

It is certified that error appears in the above-identified patent and that said Letters Patent is hereby corrected as shown below:

In the Claims

Column 13, Claim 1, Lines 39-40, delete "the designated length" and insert --a designated length of an audio sample--

Column 13, Claim 1, Lines 50-51, delete "an audio sample having a designated length" and insert --the audio sample--

Column 13, Claim 3, Line 59, delete "an audio sample" and insert --the audio sample--

Column 15, Claim 10, Lines 9-10, delete "the designated length" and insert --a designated length of an audio sample--

Column 15, Claim 10, Lines 20-21, delete "an audio sample having a designated length" and insert --the audio sample--

Column 15, Claim 12, Line 30, delete "an audio sample" and insert --the audio sample--

Column 16, Claim 16, Line 28, delete "the designated length" and insert --a designated length of an audio sample--

Column 16, Claim 16, Lines 38-39, delete "an audio sample having a designated length" and insert --the audio sample--

Column 16, Claim 18, Line 47, delete "an audio sample" and insert --the audio sample--

Signed and Sealed this
Ninth Day of April, 2019

Andrei Iancu
*Director of the United States Patent and Trademark Office*